United States Patent
Paluszek

(12) 
(10) Patent No.: US 6,658,741 B2
(45) Date of Patent: Dec. 9, 2003

(54) CUTTING MEMBER FOR LINE TRIMMER

(76) Inventor: Henry J. Paluszek, 214 N. Henry St., Brooklyn, NY (US) 11222

( * ) Notice: Subject to any disclaimer, the term of this patent is extended or adjusted under 35 U.S.C. 154(b) by 50 days.

(21) Appl. No.: 10/142,539

(22) Filed: May 10, 2002

(65) Prior Publication Data

US 2003/0208909 A1 Nov. 13, 2003

(51) Int. Cl.7 .............................. A01D 34/416
(52) U.S. Cl. ........................ 30/276; 56/12.7
(58) Field of Search ............... 30/276, 347; 56/12.7, 56/295

(56) References Cited

U.S. PATENT DOCUMENTS

| | | | |
|---|---|---|---|
| 4,550,499 A | 11/1985 | Ruzicka | |
| 4,651,422 A | 3/1987 | Everts | 30/347 |
| 4,653,256 A | 3/1987 | Saiia | |
| 4,905,465 A * | 3/1990 | Jones et al. | 56/295 |
| 4,916,886 A * | 4/1990 | Nakamura et al. | 56/12.7 |
| 5,048,187 A * | 9/1991 | Ryan | 30/276 |
| 5,077,898 A * | 1/1992 | Hartwig | 30/276 |
| 5,293,734 A | 3/1994 | Mills | |
| 5,351,403 A * | 10/1994 | Becker et al. | 30/276 |
| 5,423,126 A | 6/1995 | Byrne | 30/276 |
| 5,491,962 A | 2/1996 | Sutliff et al. | 56/12.7 |
| 6,052,976 A | 4/2000 | Cellini et al. | 56/17.4 |

* cited by examiner

Primary Examiner—Hwei-Siu Payer
(74) Attorney, Agent, or Firm—Ludomir A. Budzyn

(57) ABSTRACT

A cutting member is provided for mounting onto a guard for a line trimmer, the cutting member having at least one knife edge for cutting vegetation in concert with the flailing filament(s) of the trimmer. The knife edge is spaced from any planes swept by the flailing filaments. Additionally, the cutting member may be provided with a second knife edge that is positioned to trim excess length of the filament(s), thus ensuring no filament extends beyond the guard while in use.

18 Claims, 2 Drawing Sheets

CUTTING MEMBER FOR LINE TRIMMER

BACKGROUND OF THE INVENTION

This invention relates to line trimmers for trimming vegetation, such as weeds and grass, and, more particularly, to line trimmers having a guard mounted thereon.

In the prior art, it is known to mount guards onto line trimmers (as used herein, a "line trimmer" is a hand-held, motorized device having a drive shaft with a rotating cutting head, wherein at least one filament is mounted to the cutting head that is caused to flail upon rotation of the cutting head and used to trim vegetation, such as weeds and grass (e.g., the line trimmer sold under the brand "WEED WHACKER")).

It is also known to provide a cutting edge on the guards of line trimmers. The cutting edge is disposed in, and generally obliquely to, a plane defined by the flailing of the filament, and acts to clip excessive filament length. In this manner, the cutting edge ensures that the length of the filament does not exceed the size of the guard and, upon rotation, does not extend therebeyond. Examples of such cutting edges are shown in U.S. Pat. No. 4,550,499 to Ruzicka, and U.S. Pat. No. 6,052,976 to Cellini et al.

In U.S. Pat. No. 5,491,962 to Sutliff et al., a line trimmer is disclosed having both flexible filaments and rigid cutting blades mounted to the rotating head. The rigid cutting blades and the flexible filaments are disposed generally parallel with the flexible filaments being located above the cutting blades; the flexible filaments and the rigid cutting blades are vertically aligned. With two sets of rotating cutting elements in the Sutliff et al. device, vegetation is simultaneously double-cut upon engagement of the blades and filaments and, in effect, mulched.

It is an object of the subject invention to provide a line trimmer having a cutting member with at least one rigid knife edge disposed on a guard that is non-rotatably mounted onto the line trimmer.

It is also an object of the subject invention to provide a line trimmer having a cutting member with at least one rigid knife edge disposed on a guard, with the knife edge being spaced from a plane defined by the flailing of a filament upon rotation of the cutting head.

SUMMARY OF THE INVENTION

The aforementioned objects are met by a line trimmer having a guard mounted thereto, with a cutting member having at least one rigid knife edge being disposed on the guard. The line trimmer also includes at least one filament which flails upon rotation of the cutting head. The knife edge is spaced from any plane defined by the flailing filament(s). Advantageously, the knife edge cuts vegetation in concert with the filament(s). As a variation, the cutting member may include a second knife edge which is disposed to pass through the plane(s) defined by the flailing filament(s) so as to trim excess length of the filament(s). Accordingly, the filament(s) will not extend beyond the guard of the line trimmer while flailing.

These and other features will be better understood through a study of the following detailed description and accompanying drawings.

DETAILED DESCRIPTION OF THE INVENTION

Figure 1:
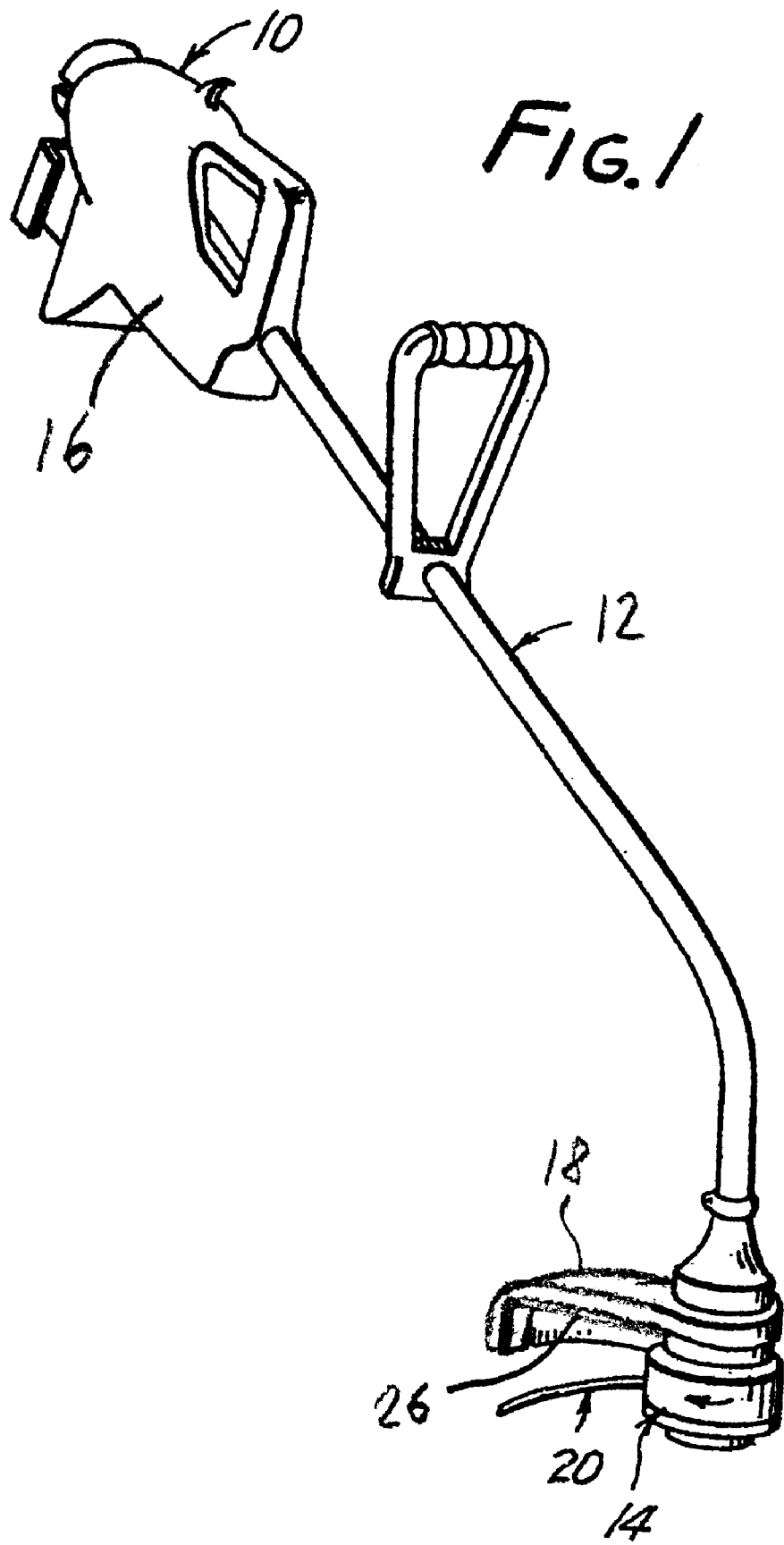
FIG. 1 is a perspective view of a line trimmer in accordance with the subject invention.

With reference to FIG. 1, a line trimmer is shown and generally designated with the reference numeral 10. The line trimmer 10, as is typical in the art, includes a drive shaft 12, to which is mounted a cutting head 14, a motor 16 for causing rotation of the cutting head 14, and a guard 18. The design and configuration of the drive shaft 12, the cutting head 14 and the motor 16 are well known in the prior art and any such design and configuration may be used herein.

Figure 2:
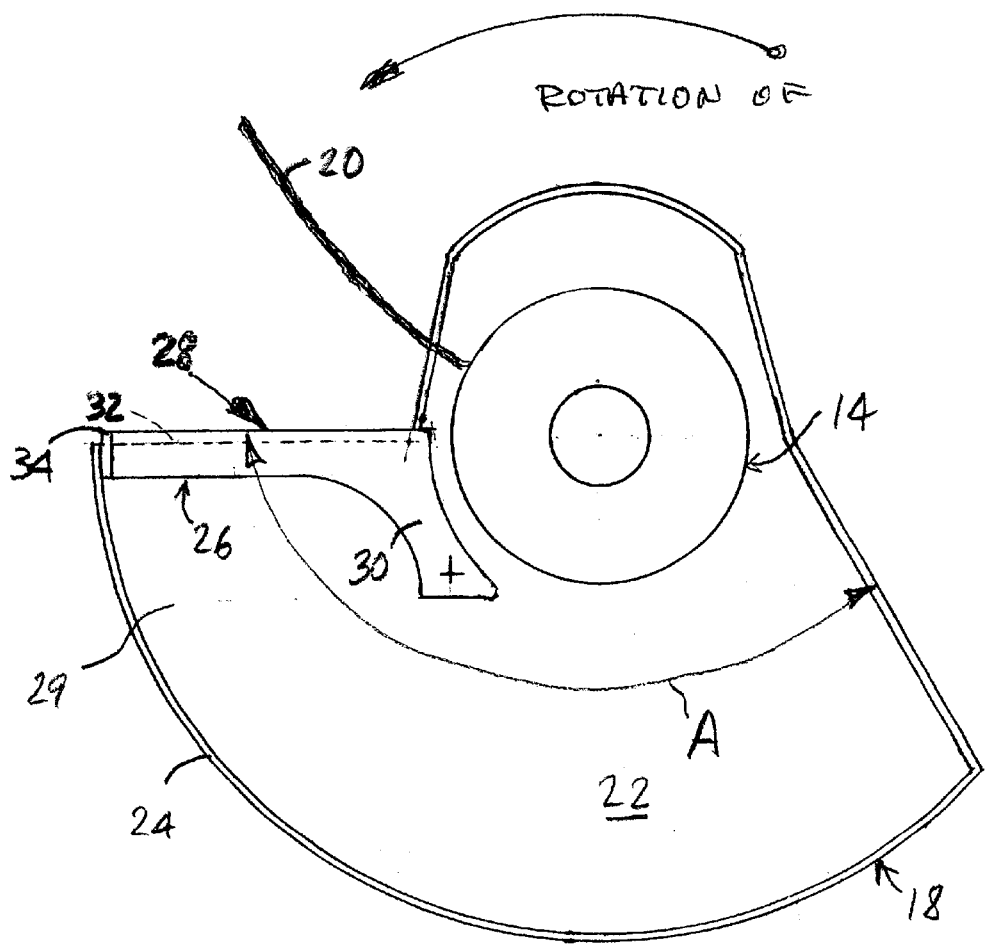
FIG. 2 is a bottom plan view of a guard, cutting head and filament of the line trimmer; and, FIG. 3 is a side elevational view of the guard, cutting head, and filament.
Figure 3:
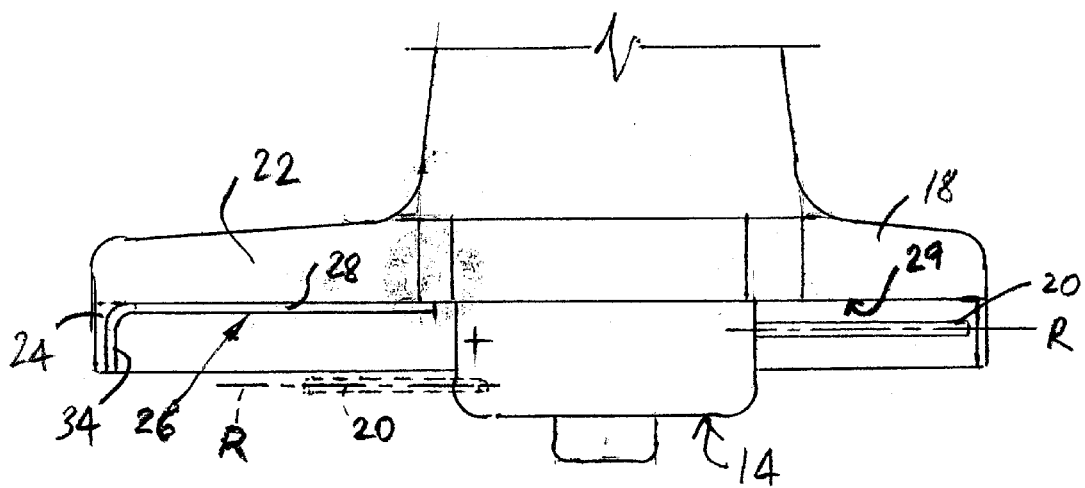

With reference to FIGS. 2 and 3, the cutting head 14 is generally disc-shaped with at least one filament 20 being mounted thereto and extending therefrom. Although a single filament 20 is shown in the FIG. 2, multiple filaments may be used, as is customary in the prior art and shown representatively in dashed lines in FIG. 3. The filament 20 is mounted to the cutting head 14 using any technique known in the prior art, such as being spool-mounted or threaded directly into the cutting head 14.

Upon rotation of the cutting head 14, the filament 20 is caused to flail. With the filament 20 flailing, a reference plane R is defined by the sweeping motion of the filament 20. If multiple filaments 20 are used, each of the filaments 20 sweeps a reference plane R, the multiple reference planes R being coplanar, not coplanar, or a combination thereof.

The guard 18 is preferably non-rotatably mounted to the drive shaft 12 and is located in proximity to the cutting head 14. The guard 18 radiates outwardly from the drive shaft 12 to at least sweep across an arc A. In particular, the guard 18 includes a top portion 22, which radiates outwardly from the drive shaft 12, and a skirt 24 which depends downwardly from the top portion 22. The top portion 22 and the skirt 24 may be formed with various dimensions (i.e., the size of the arc A; the radius of the top portion 22; the height of the skirt 24)—it must be noted that the guard 18 serves to protect a user from rocks, gravel, cut grass, and other debris which are hurled upwardly and/or outwardly from the cutting head 14 during use, so the extent of selected dimensions will dictate the amount of protection afforded by the guard 18.

A cutting member 26 is mounted to the top portion 22, and, preferably, the cutting member 26 is rigidly mounted to prevent movement thereof. As shown in FIG. 2, the cutting member 26 has a rigid knife edge 28 which extends beyond the top portion 22. The knife edge 28 may be of any cutting edge design known in the prior art which serves to cut vegetation in addition to the filament 20 as described below (e.g. a tapered edge; a dihedral edge). Preferably, the knife edge 28 (and the cutting member 26) are metallic, e.g., steel.

The knife edge 28 is located to oppose the movement of the filament 20. In addition, as shown in FIG. 3, the knife edge 28 is located to be spaced from the reference planes R, and, preferably is disposed to be generally parallel to at least one of the reference plane(s) R. If multiple filaments are mounted to the cutting head 14, the knife edge 28 is spaced from all of the reference planes R. As a result of this configuration, the flailing filament 20 strikes vegetation against the knife edge 28 resulting in the vegetation being cut both by the filament 20 and the knife edge 28; the knife edge 28 acts to second-cut vegetation in a mulching effect. If multiple filaments are used, the vegetation is further cut into smaller parts further enhancing the mulching effect.

The cutting member 26 can be mounted to the guard 18 using any technique known to those skilled in the art. Preferably, the cutting member 26 is mounted to a lower surface 29 of the top portion 22 of the guard 18. Also, the cutting member 26 is formed with a rearwardly-extending moment arm 30 which extends generally in the same direction as the rotation of the cutting head 14. More preferably, the moment arm 30 is formed to be located in proximity to the cutting head 14. By extending in the same direction as the rotation of the cutting head 14, the moment arm 30 counteracts force imparted thereto by the filament 20 (via impacted vegetation). In addition, the largest imparted force is located closest to the cutting head 14, thus, requiring the most-significant counteraction in proximity thereto.

In a preferred arrangement, the knife edge 28 extends beyond an edge 32 which defines one limit of the arc A of the guard 18. It is also preferred that the knife edge 28 be generally parallel to the edge 32 and be at least coextensive therewith.

As an additional variation, the cutting member 26 may be unitarily formed with a second knife edge 34 (preferably, metallic (e.g., steel)) that is disposed inside of the skirt 24 and passes through at least one of the reference planes R. As shown in FIG. 3, the knife edge 28 and the second knife edge 34 may define a L-shape with the cutting member 26 being formed from a unitary piece of metal. The second knife edge 34 is positioned to trim excess length of the filament(s) 20. In this manner, no filament 20 will flail into, or beyond, the guard 18.

As is readily apparent, numerous modifications and changes may readily occur to those skilled in the art, and hence it is not desired to limit the invention to the exact construction and operation as shown and described, and, accordingly, all suitable modification equivalents may be resorted to falling within the scope of the invention as claimed.

What is claimed is:

1. A line trimmer for trimming vegetation comprising:
   a drive shaft;
   a cutting head rotatably mounted to said drive shaft;
   a first filament mounted to said cutting head;
   a motor for causing rotation of said cutting head; and,
   a guard mounted onto said drive shaft in proximity to said cutting head, said guard radiating outwardly from said drive shaft to at least sweep across an arc, said first filament being flailed within said guard upon rotation of said cutting head, wherein a cutting member is disposed on said guard, said cutting member having a knife edge spaced from a first plane defined by the flailing of said first filament.

2. A line trimmer as in claim 1, wherein said knife edge is exposed.

3. A line trimmer as in claim 1, wherein said knife edge is disposed to be generally parallel to said first plane.

4. A line trimmer as in claim 1 further comprising a second filament mounted to said cutting head, said second filament being flailed within said guard upon rotation of said cutting head, wherein said knife edge is spaced from a second plane defined by the flailing of said second filament.

5. A line trimmer as in claim 4, wherein said first and second planes are coplanar.

6. A line trimmer as in claim 4, wherein said first and second planes are not coplanar.

7. A line trimmer as in claim 1, wherein said guard includes a top portion which radiates outwardly from said drive shaft, and a skirt, said skirt downwardly depending from said top portion, said first plane passing through at least portions of said skirt, wherein said top portion terminating in guard edges defining outermost bounds of said arc swept by said guard, and wherein said cutting member being mounted with said knife edge extending from one of said guard edges.

8. A line trimmer as in claim 7, wherein said knife edge being generally parallel to at least one of said guard edges.

9. A line trimmer as in claim 7, wherein said knife edge being generally coextensive with one of said guard edges.

10. A line trimmer as in claim 1, wherein said cutting member is formed with a moment arm.

11. A line trimmer as in claim 10, wherein said cutting head rotates in a direction to cause said first filament to flail towards said knife edge, and wherein said moment arm extending away from said cutting member in a direction of rotation of said cutting head.

12. A line trimmer as in claim 10, wherein said moment arm is located in proximity to said cutting head.

13. A line trimmer as in claim 1, wherein said cutting head rotates in a direction to cause said first filament to flail towards said knife edge.

14. A line trimmer as in claim 1, wherein said cutting member is formed with a second knife edge, said second knife edge being disposed to pass through said first plane.

15. A line trimmer as in claim 14, wherein said second knife edge and said knife edge define a L-shape.

16. A line trimmer as in claim 14, wherein said cutting member is unitarily formed.

17. A line trimmer as in claim 1, wherein said guard is non-rotatably mounted to said drive shaft.

18. A line trimmer as in claim 1, wherein said knife edge comprises metal.

* * * * *